(12) United States Patent
Matsui et al.

(10) Patent No.: US 7,029,522 B2
(45) Date of Patent: Apr. 18, 2006

(54) RUST PREVENTION COATING AGENT AND METHOD OF RUST-PROOFING

(75) Inventors: Norizumi Matsui, Kamakura (JP); Toshio Inbe, Yokohama (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 10/778,236

(22) Filed: Feb. 17, 2004

(65) Prior Publication Data

US 2004/0217328 A1    Nov. 4, 2004

(30) Foreign Application Priority Data

Feb. 17, 2003  (JP)  .............................. 2003-038598
Feb. 4, 2004   (JP)  .............................. 2004-028372

(51) Int. Cl.
*G23F 11/14*  (2006.01)

(52) U.S. Cl. .............................. 106/14.44; 106/14.15; 252/388

(58) Field of Classification Search ............. 106/14.15, 106/14.44; 252/388
See application file for complete search history.

(56) References Cited

U.S. PATENT DOCUMENTS 6,818,313 B1 * 11/2004 Phelps et al. ............... 428/457

FOREIGN PATENT DOCUMENTS

| JP | 5302042 | 11/1993 |
|---|---|---|
| JP | 2000204485 | 7/2000 |
| JP | 2001234352 | 8/2001 |
| WO | WO-01/12876 A1 | 2/2001 |
| WO | WO-03/060191 A2 | 7/2003 |
| WO | WO 03/093533 A1 * | 11/2003 |

OTHER PUBLICATIONS

Chemical Abstract No. 139:367895, abstact of PCT International Application No. WO 03/093533 (Nov. 2003).*
English language translation of JP 2000-204485A (Jul. 25, 2000).*

* cited by examiner

*Primary Examiner*—Anthony J Green
(74) *Attorney, Agent, or Firm*—Connolly, Bove, Lodge & Hutz, LLP

(57) ABSTRACT

A rust prevention coating agent which can be used even in uses requiring high corrosion-resistant performance because of having corrosion resistance superior to a conventional surface treatment agent, and is excellent in the adhesion to a coating film, and a method of rust-proofing using the same are provided. The prevention coating agent comprises a fluorine and zirconium-containing compound and certain guanidine compounds and/or salts thereof.

8 Claims, No Drawings

RUST PREVENTION COATING AGENT AND METHOD OF RUST-PROOFING

TECHNICAL FIELD

The present invention relates to a rust prevention coating agent and a method of rust-proofing.

BACKGROUND ART

As a method of surface treatment of aluminum and/or aluminum alloy, there is known chromate treatment, and zirconium phosphate treatment (cf. Japanese Kokai Publication Hei-05-302042, for instance). However, since chromate treatment uses harmful chromium metal, it causes a problem of liquid waste treatment. In zirconium phosphate treatment, there is a problem of being low in corrosion resistance.

Further, though surface treating agents which use a fluorine and zirconium-containing compound are used, there may be cases where the corrosion resistance is inadequate in some uses even though using such surface treating agents. Therefore, a rust prevention coating agent is desired, which can impart higher corrosion resistance to aluminum and/or aluminum alloy. As such a rust prevention coating agent, there has been disclosed a surface treating agent, which contains a zirconium compound and a compound containing nitrogen atoms having a lone pair (cf. Japanese Kokai Publication 2000-204485, for instance). But, adequate corrosion resistance has not been attained even though using such a surface treating agent. And, coats obtained by using such a surface treating agent were inadequate for being adopted as a rust-proofing because they have low corrosion resistance during not yet being coated and insufficient adhesion to a coating film.

SUMMARY OF THE INVENTION

In consideration of the above circumstances, it is an object of the present invention to provide a rust prevention coating agent which can be used even in uses requiring high corrosion-resistant performance because of having corrosion resistance superior to a conventional surface treatment agent, and is excellent in the adhesion to a coating film, and a method of rust-proofing using the same.

The present invention is a rust prevention coating agent comprising a fluorine and zirconium-containing compound and a guanidine compound and/or salt thereof, wherein said guanidine compound and/or salt thereof is a compound, having a weight-average molecular weight of 59 to 1000000, expressed by the following general formula (1) and/or salt thereof;

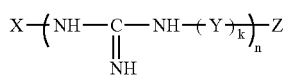

(1)

in the formula, Y represents the formula of $-C(=NH)-NH-(CH_2)_m-$, $-C(=O)-NH-(CH_2)_m-$, or -, $-C(=S)-NH-(CH_2)_m-$, m is an integer of 0 to 20, n is a positive integer, k is 0 or 1, X represents hydrogen, an amino group, a hydroxyl group, a methyl group, a phenyl group, a chlorophenyl group or a methylphenyl group (tolyl group), and Z represents hydrogen, an amino group, a hydroxyl group, a methyl group, a phenyl group, a chlorophenyl group, a methylphenyl group (tolyl group) or a polymer, having a weight-average molecular weight of 200 to 1,000,000, being a polymer comprising, as a repeating unit, one of the polymerization groups represented by the following general formula (2);

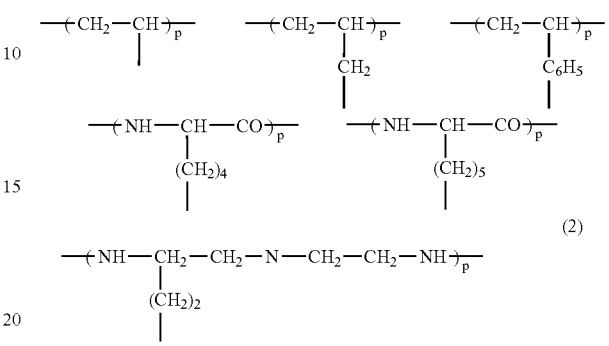

(2)

in the formula, p is an integer.

Preferably, said guanidine compound is at least one compound selected from the group consisting of guanidine, aminoguanidine, guanylthiourea, 1,3-diphenylguanidine, 1,3-di-o-tolylguanidine, 1-o-tolyl biguanide, polyhexamethylene biguanidine, polyhexaethylenebiguanidine, polypentamethylenebiguanidine, polypentaethylenebiguanidine, polyvinylbiguanidine, polyallylbiguanidine and chlorhexidine gluconate.

Preferably, said guanidine compound and/or salt thereof has a biguanide structure represented by the following general formula (3) in a molecule;

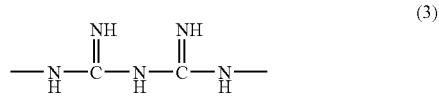

(3)

Preferably, said rust prevention coating agent comprises the fluorine and zirconium-containing compound of 10 to 10000 ppm and the guanidine compound and/or salt thereof of 1 to 10000 ppm and an effective fluorine ion concentration of 0.1 to 1000 ppm and has a pH of 1 to 5.

The present invention is a method of rust-proofing aluminum and/or aluminum alloy comprising a step of treating a metal surface with a rust prevention coating agent, wherein said rust prevention coating agent is the rust prevention coating agent mentioned above.

DETAILED DESCRIPTION OF THE INVENTION

Hereinafter, the present invention will be described in detail.

The present invention relates to a rust prevention coating agent which can be favorably applied to aluminum, aluminum alloy and the like. That is, the present invention relates to a rust prevention coating agent which can attain rust-preventive performance superior to surface treated metal which is treated with a rust prevention coating agent consisting of only a fluorine and zirconium-containing compound.

The guanidine compound is hardly soluble in water but it can be blended in the above-mentioned rust prevention coating agent by cationizing it with an organic acid and the like to make it water-soluble. And, when an aluminum-based metal substrate is treated with the rust prevention coating agent, aluminum is dissolved by fluoride and thereby a pH increases and the guanidine compound becomes insoluble to precipitate. Also, the zirconium compound precipitates concurrently with such the precipitation of the guanidine compound. It is assumed that thereby, a robust rust-preventive coat comprising the zirconium compound and the guanidine compound was formed and rust-preventive performance superior to a rust prevention coating agent consisting of only the zirconium compound is attained. Since the guanidine compound is apt to precipitate particularly at the surface of a coat, it also has a property of enhancing the adhesion to an organic coat layer formed on the rust-proofed layer.

A guanidine compound and/or salt thereof is a compound having a guanidine skeleton in a molecule. The guanidine compound and/or salts thereof used in the present invention is expressed by the above-mentioned general formula (1). The above-mentioned guanidine compound and/or salts thereof is not specifically limited and, for example, guanidine, aminoguanidine, guanylthiourea, 1,3-diphenylguanidine, 1,3-di-o-tolylguanidine, 1-o-tolyl biguanide, polyhexamethylene biguanidine, polyhexaethylenebiguanidine, polypentamethylenebiguanidine, polypentaethylenebiguanidine, polyvinylbiguanidine, polyallylbiguanidine, and salts thereof can be given. The above-mentioned salt of the guanidine compound is not specifically limited and, for example, organic acid salt such as phosphate, hydrochloride, sulfate, acetate and gluconate can be given. Preferably, a total amount of the above-mentioned salt is within a range from 0.1 of a lower limit to 100 of an upper limit in terms of molar ratio relative to the guanidine compound.

The guanidine compound and/or salt thereof has a weight-average molecular weight of within a range from 59 of a lower limit to 1000000 of an upper limit. The weight-average molecular weight is not less than 59, because the weight-average molecular weight of guanidine which is expressed by the following general formula (1) and has the lowest weight-average molecular weight is 59, and when it is more than 1000000, there is a possibility that the guanidine compound may not dissolve in water. The above-mentioned lower limit is preferably 300, more preferably 500. The above-mentioned upper limit is preferably 100000, more preferably 20000.

A blending amount of the above guanidine compound and/or salt thereof is within a range from 1 ppm of a lower limit to 10000 ppm of an upper limit on the solid matter concentration in the rust prevention coating agent of the present invention. When this amount is less than the above-mentioned lower limit, it is undesired since an adequate rust prevention effect may not be attained, and when it is more than the above-mentioned upper limit, it is also undesired since a chemical conversion reaction is inhibited. The above-mentioned lower limit is more preferably 10 ppm, and the above-mentioned upper limit is more preferably 1000 ppm.

Preferably, the above-mentioned guanidine compound and/or salt thereof is one which has a biguanide structure represented by the following general formula (3) in a molecule:

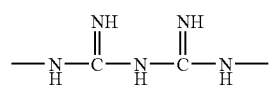

since this compound has a large effect of imparting a rust-preventive property. The guanidine compound and/or salts thereof having the above-mentioned biguanide structure is not specifically limited and, for example, polyhexamethylene biguanidine, o-tolyl biguanide, chlorhexidine gluconate, polyalkylene polyamine-ammonium dicyanamide condensate, and/or salts thereof can be given. The guanidine compound and/or salt thereof may be used alone or in combination of two or more kinds.

The above-mentioned fluorine and zirconium-containing compound is not specifically limited and, for example, fluorozirconic acid or its lithium salt, sodium salt, potassium salt or ammonium salt, and zirconium fluoride can be given. And, a compound obtained by dissolving zirconium compounds such as zirconium oxides in an aqueous solution of fluoride such as hydrofluoric acid may be used.

And, an effective fluorine concentration may be adjusted by using hydrofluoric acid, ammonium fluoride, ammonium hydrogenfluoride, sodium fluoride, sodium hydrogenfluoride and so on in addition to the fluorozirconate compound as a supply source of the fluorine.

Preferably, a blending amount of the fluorine and zirconium-containing compound in the rust prevention coating agent of the present invention is within a range from 10 ppm of a lower limit to 10000 ppm of an upper limit as a zirconium ion concentration. When the blending amount is less than 10 ppm, there is a possibility that the rust-preventive performance may not be enhanced since the zirconium compound does not adequately precipitate at the metal surface. And, when it is more than 10000 ppm, further improvement cannot be expected and economically disadvantageous. More preferably, the above-mentioned lower limit is 30 ppm and the above-mentioned upper limit is 1000 ppm.

And, with respect to the rust prevention coating agent of the present invention, it is preferred that an effective fluorine ion concentration is within a range from 0.1 ppm of a lower limit to 1000 ppm of an upper limit. The effective fluorine ion concentration means HF or $F^-$, which does not form a complex salt with an aluminum ion, a zirconium ion and the like. When the effective fluorine ion concentration is less than 0.1 ppm, there is a problem that adequate rust-preventive performance is not attained since etching of the surface of aluminum does not proceed well, and when it is more than 1000 ppm, there is a problem that rust-preventive performance is not attained because of excessive etching. More preferably, the above-mentioned lower limit is 1 ppm and the above-mentioned upper limit is 500 ppm. Still more preferably, the above-mentioned upper limit is 50 ppm.

Preferably, a pH of the rust prevention coating agent of the present invention is within a range from 1 of a lower limit to 5 of an upper limit. When the pH is less than 1, it becomes impossible to obtain a sufficient coat amount since the zirconium compound and the guanidine compound cease precipitation, and therefore the rust-preventive performance may be deteriorated. When the pH is more than 5, it is not preferable since the zirconium compound precipitates in a treatment bath and a sufficient coat amount cannot be obtained. More preferably, the above-mentioned lower limit is 2.5 and the above-mentioned upper limit is 4.5.

In addition to the above-mentioned ingredients, the rust prevention coating agent of the present invention may contains metal ions such as titanium, manganese, zinc, cerium, iron, molybdenum, vanadium, trivalent chromium, silicon and the like; another rust prevention materials such as tannic acid, imidazoles, triazines, triazoles, guanines, hydrazines, a phenolic resin, an epoxy resin, a silane coupling agent, colloidal silica, amines, phosphoric acid; a surfactant; chelator; aluminum ion and the like. Among them, an aluminum ion is preferable since it has the action to promote the precipitation of the zirconium coat.

A method of rust-proofing, in which a substrate is treated by using the above-mentioned rust prevention coating agent, is one of the present invention. As the above-mentioned substrate, there is favorably used aluminum and/or aluminum alloy. The above-mentioned aluminum and/or aluminum alloy is not specifically limited and, for example, 5000 series aluminum alloys and 6000 series aluminum alloys can be given.

In the method of rust-proofing of the present invention, aluminum and/or aluminum alloy may be one, the surface of which is degreased as required. The degreasing is performed to remove an oil matter or a stain adhered to the surface of the substrate and immersion treatment is conducted usually at 30 to 75° C. for from 2 to 180 seconds with a degreasing agent containing alkaline ingredients or acidic ingredients. It is also possible to perform predegreasing prior to degreasing as required. And, the aluminum and/or aluminum alloy may be one, the surface of which is etched as required. The etching is for removing oxidized layers of aluminum or smut components and may be performed with either alkaline or acidic substance.

A method of applying the rust prevention coating agent is not specifically limited and, for example, a spraying technique and an immersing technique can be given. As a temperature at which the rust prevention coating agent is applied, it is preferably within a range from 10° C. of a lower limit to 80° C. of an upper limit. More preferably, the above-mentioned lower limit is 30° C. and the above-mentioned upper limit is 60° C. When the temperature is lower than 10° C., a precipitation rate of the coat is slow and an adequate film formation property cannot be attained. On the other hand, when it is higher than 80° C., it is undesired from the viewpoint of thermal energy conservation. Further, heat drying after coating may be done as required.

Preferably, an amount of the coat formed by the method of rust-proofing is within a range from 1 mg/m$^2$ of a lower limit to 500 mg/m$^2$ of an upper limit as an amount of zirconium. When this amount is less than 1 mg/m$^2$, corrosion resistance may be deteriorated. When it is more than the above-mentioned upper limit, it is not preferable because of being uneconomical. More preferably, the above-mentioned lower limit is 10 mg/m$^2$ and the above-mentioned upper limit is 100 mg/m$^2$.

In the method of rust-proofing of the present invention, hydrophilic treatment may be further performed. A hydrophilic treating agent for applying the hydrophilic treatment is not specifically limited and, for example, conventionally publicly known hydrophilic treating agents comprising hydrophilic resin and the like can be used. As the above-mentioned hydrophilic resin, water-soluble or water-dispersible hydrophilic resin, containing a hydroxyl group, a carboxyl group, a amide group, a amino group, a sulfonic acid group and/or an ether group, is preferable and hydrophilic resin, forming a coat on which a water droplet has a contact angle of 35° angle or less, is more preferable. Since such a coat exhibits a good hydrophilic property, it is possible to impart a sufficient hydrophilic property to a substrate when a hydrophilic treating agent comprising the above-mentioned hydrophilic resin is applied.

As the above-mentioned hydrophilic resin, for example, polyvinyl alcohol, polyvinyl pyrolidone, poly acrylic acid, polystyrene sulfonic acid, polyacrylamide, carboxymethylcellulose, polyethylene oxide, water-soluble nylon, copolymers of monomers forming these polymers, acrylic polymers having a polyoxyethylene chain such as 2-methoxy polyethyleneglycol methacrylate/2-hydroxyethyl acrylate copolymer are preferable.

Preferably, the above-mentioned hydrophilic treating agent further contains a guanidine compound and/or salt thereof because the rust-preventive property can be imparted concurrently with the hydrophilic property. The above-mentioned guanidine compound and/or salts thereof is not specifically limited as long as it is a compound applicable for the rust prevention coating agent of the present invention. It is possible to impart the excellent rust-preventive property and hydrophilic property by conducting hydrophilic treatment with such a hydrophilic treating agent.

The rust prevention coating agent of the present invention can form the coat having corrosion resistance superior to a conventional surface treating agent. Therefore, the treated substrate, rust-proofed by the method of rust-proofing of the present invention which is constituted by using the above-mentioned rust prevention coating agent, can be used even in uses requiring high corrosion-resistant performance.

It is possible to form a coat having the high rust-preventive property by using the rust prevention coating agent of the present invention. And, the coat obtained by using the rust prevention coating agent of the present invention has the adhesion to a coating film superior to the coat obtained by using the conventional zirconium-containing rust prevention coating agent. Even though hydrophilic treatment is applied after being coated with the rust prevention coating agent of the present invention, the rust-preventive property is not impaired and the adequate hydrophilic property and rust-preventive property can be simultaneously exerted.

EXAMPLES

Hereinafter, the present invention will be described in more detail by way of examples, but the present invention is not limited to these examples. And, a term "part" means "weight part" in Examples, unless otherwise specified.

Examples 1 to 14 and Comparative Examples 1 to 4

Preparation of Rust Prevention Coating Agent

A: a fluorozirconic acid, B: ammonium fluorozirconate, and C: potassium fluorozirconate as fluorine and zirconium-containing compounds, and A: polyhexamethylene biguanidine acetate, B: chlorhexidine gluconate, C: o-tolyl biguanide, and D: acetate of polyalkylene polyamine-ammonium dicyanamide condensate as guanidine compounds, and A: aluminum hydrooxide, B: hydrofluoric acid, C: phenolic resin, D: tannic acid, E: fluorotitanic acid, F: potassium permanganate, G: cerium sulfate, and H: phosphoric acid as additives were blended and ion-exchanged water was added to the mixture to prepare a rust prevention coating agent as shown in Table 1.

Preparation of Hydrophilic Treating Agent

Polyhexamethylene biguanidine acetate (0.1 part) as a guanidine compound, and 2 parts of polyvinyl alcohol (saponification degree 99%, number-average molecular weight 20000) as a solid matter and 1 part of 2-methoxy polyethyleneglycol methacrylate/2-hydroxyethyl acrylate copolymer (weight ratio of respective monomers 7:3, number-average molecular weight 10000) as a solid matter, respectively, as hydrophilic resins, and 0.1 part of cresol phenolic resin (molecular weight about 500) as an additive were blended and ion-exchanged water was added to the mixture to prepare a hydrophilic treating agent A.

Preparation of Test Sheet

Test sheets having a size of 70 mm×150 mm×0.8 mm (A1100 manufactured by Nippon Testpanel Co., Ltd.) were degreased by spraying at 65° C. for 5 sec using a 3% aqueous solution of alkaline degreasing agent (SURF CLEANER 322N8 manufactured by NIPPON PAINT Co., Ltd.). After washing by spraying running water for 30 seconds, the test sheets were immersed in a 2% aqueous solution of the above-mentioned rust prevention coating agent of 60° C. under conditions shown in Table 1. The zirconium amount (mg/m$^2$) in the coat was measured by using "XRF-1700" (X-ray fluorescence spectrometer manufactured by Shimadzu Corp.) and the carbon amount (mg/m$^2$) in the coat was measured by using "RC 412" (moisture content analyzer manufactured by LECO Corp. (USA)).

Evaluation of Physical Properties of Test Sheet

With respect to the above-mentioned test sheets, corrosion resistance, adhesion and hydrophilic property were evaluated by an evaluation method described below.

<Corrosion Resistance>

According to JIS Z 2371, 5% solution of sodium chloride was sprayed onto the test sheets at 35° C., and after 240 hours, an area where white rust formed was evaluated visually using the following criteria.
10: no white rust
9: area with white rust formed is less than 10%
8: likewise, less than 20%
7: likewise, less than 30%
6: likewise, less than 40%
5: likewise, less than 50%
4: likewise, less than 60%
3: likewise, less than 70%
2: likewise, less than 80%
1: likewise, less than 90%

<Adhesion>

A coating composition, A-55 (acrylic coating composition, manufactured by NIPPON PAINT Co., Ltd.), was applied to the above rust-proofed test sheets so as to be 5 □m in dry film thickness using a bar coater and the test sheets were baked at 240° C. for 40 sec. to be dried.

The surface of the obtained test sheets were cut so as to provide 10×10 grids with distances of 1 mm and CASS tests were conducted on these test sheets for 48 hours (according to JIS H 8681, 5.1 to 5.7). After CASS test, cut portions were peeled off with an adhesive tape and percentages of coating remaining in the grids were obtained. Results are shown in Table 1.

Examples 15 to 21 and Comparative Examples 5 to 7

Commercially available hydrophilic treating agent (SURF ALCOAT 240, SURF ALCOAT 1100 and SURF ALCOAT 131, manufactured by NIPPON PAINT Co., Ltd.) and 2% aqueous solution of the above-mentioned hydrophilic treating agent A were applied to the rust-proofed test sheets obtained in the above Examples and Comparative Examples so as to be 5 g/m$^2$ in dry film thickness using a bar coater and the test sheets were baked in such a way that temperature reached was 150° C. for 5 minutes to prepare test sheets.

<Hydrophilic Property>

The resulting test sheets were contacted with running water for 72 hours and then a contact angle of a water droplet on the test sheet was measured. It is considered that the smaller the contact angle, the higher the hydrophilic property. The contact angle was measured with Automatic Contact Angle Meter CA-Z (manufactured by Kyowa Interface Science Co., LTD.). These results are shown in Table 2.

TABLE 1

| | | Examples | | | | | | | | | | | | | | | Comparative Examples | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 | 3 | 4 |
| Fluoro- | A | 0.01 | — | — | 0.01 | 0.01 | 0.01 | 0.01 | 0.01 | 0.01 | 0.01 | 0.01 | 0.01 | 0.01 | 0.01 | 0.01 | — | — | 0.01 |
| zirconium | B | — | 0.01 | — | — | — | — | — | — | — | — | — | — | — | — | — | 0.01 | — | — |
| compound | C | — | — | 0.01 | — | — | — | — | — | — | — | — | — | — | — | — | — | — | — |
| Guanidine | A | 0.01 | 0.01 | 0.01 | — | — | — | 0.01 | 0.01 | 0.01 | 0.01 | 0.01 | 0.01 | 0.01 | 0.01 | — | — | 0.01 | — |
| compound | B | — | — | — | 0.01 | — | — | — | — | — | — | — | — | — | — | — | — | — | — |
| | C | — | — | — | — | 0.01 | — | — | — | — | — | — | — | — | — | — | — | — | — |
| | D | — | — | — | — | — | 0.01 | — | — | — | — | — | — | — | — | — | — | — | — |
| Additives | A | — | — | — | — | — | — | — | 0.01 | — | — | — | — | — | — | — | — | — | — |
| | B | — | — | — | — | — | — | — | 0.02 | — | — | — | — | — | — | — | — | — | — |
| | C | — | — | — | — | — | — | — | — | 0.01 | — | — | — | — | — | — | — | — | — |
| | D | — | — | — | — | — | — | — | — | — | 0.01 | — | — | — | — | — | — | — | 0.01 |
| | E | — | — | — | — | — | — | — | — | — | — | 0.002 | — | — | — | — | — | — | — |
| | F | — | — | — | — | — | — | — | — | — | — | — | 0.002 | — | — | — | — | — | — |
| | G | — | — | — | — | — | — | — | — | — | — | — | — | 0.002 | — | — | — | — | — |
| | H | — | — | — | — | — | — | — | — | — | — | — | — | — | 0.002 | — | 0.01 | — | — |
| pH | | 4 | 4 | 4 | 4 | 4 | 4 | 4 | 4 | 4 | 4 | 4 | 4 | 4 | 2 | 4 | 2.5 | 4 | 4 |
| Time (second) | | 30 | 30 | 30 | 30 | 30 | 30 | 30 | 30 | 30 | 30 | 30 | 30 | 30 | 5 | 30 | 30 | 30 | 30 |
| Temperature (° C.) | | 60 | 60 | 60 | 60 | 60 | 60 | 60 | 60 | 60 | 60 | 60 | 60 | 60 | 60 | 60 | 60 | 60 | 60 |
| Corrosion resistance | | 9 | 9 | 9 | 9 | 9 | 8.5 | 9 | 9 | 9 | 9.5 | 9 | 9 | 9 | 8.5 | 5 | 3 | 1 | 5 |
| Adhesion | | 100 | 100 | 100 | 100 | 100 | 100 | 100 | 100 | 100 | 100 | 100 | 100 | 100 | 100 | 60 | 80 | 60 | 80 |
| Zirconium amount in coat (mg/m$^2$) | | 40 | 45 | 38 | 44 | 38 | 45 | 47 | 39 | 38 | 45 | 38 | 37 | 40 | 34 | 45 | 35 | — | 44 |

TABLE 1-continued

| | Examples | | | | | | | | | | | | | | Comparative Examples | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 |
| Carbon amount in coat (mg/m²) | 5.5 | 4.8 | 6.2 | 3.8 | 4.5 | 6.5 | 6.2 | 6 | 6 | 5.5 | 5.8 | 5.4 | 4.8 | 4.2 | — | — | 2.5 | 3.2 |

TABLE 2

| | Examples | | | | | | | Comparative Examples | | |
|---|---|---|---|---|---|---|---|---|---|---|
| | 15 | 16 | 17 | 18 | 19 | 20 | 21 | 5 | 6 | 7 |
| Test sheet after rust prevention treatment | Example 1 | Example 4 | Example 5 | Example 9 | Example 11 | Example 12 | Example 1 | Comparative Example 1 | Comparative Example 2 | Comparative Example 4 |
| Hydrophilic treating agent | | | | | | | | | | |
| SURF ALCOAT 240 | ○ | | | ○ | | | | ○ | | |
| SURF ALCOAT 1100 | | ○ | | | ○ | | | | ○ | |
| SURF ALCOAT 131 | | | ○ | | | ○ | | | | ○ |
| Hydrophilic treating agent A | | | | | | | ○ | | | |
| Corrosion resistance | 9 | 9 | 8.5 | 9 | 9 | 8.5 | 10 | 7 | 7 | 7 |
| Hydrophilic property | 12 | 10 | 16 | 10 | 9 | 13 | 30 | 12 | 10 | 16 |

It was shown from Table 1 that the test sheets treated by using the rust prevention agent of the present invention had a high rust-preventive property. And, it was shown that these test sheets were also superior in the adhesion to a coating film in the case of forming the coating film further on the rust-preventive coat.

As shown in Table 2, it was found that coats, having the higher rust-preventive property, were obtained in Examples 15 to 21 in which hydrophilic treatment was conducted after the test sheets were treated with the rust prevention coating agent of the present invention rather than Comparative Examples in which hydrophilic treatment was conducted using a hydrophilic resin after the test sheets were treated with the conventional zirconium-containing rust prevention coating agent.

The invention claimed is:

1. A rust prevention coating agent comprising a fluorine and zirconium-containing compound and a guanidine compound and/or salt thereof,
    wherein said guanidine compound and/or salt thereof is a compound, having a weight-average molecular weight of 59 to 1000000, expressed by the following general formula (1) and/or salt thereof;

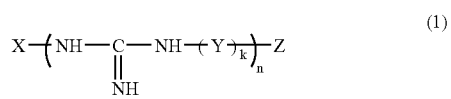

(1)

in the formula, Y represents the formula of —C(=NH)—NH—(CH$_2$)$_m$—, —C(=O)—NH—(CH$_2$)$_m$—, or —, —C(=S)—NH—(CH$_2$)$_m$—, m is an integer of 0 to 20, n is a positive integer, k is 0 or 1, X represents hydrogen, an amino group, a hydroxyl group, a methyl group, a phenyl group, a chlorophenyl group or a methylphenyl group (tolyl group), and Z represents hydrogen, an amino group, a hydroxyl group, a methyl group, a phenyl group, a chlorophenyl group, a methylphenyl group (tolyl group) or a polymer, having a weight-average molecular weight of 200 to 1,000,000, being a polymer comprising, as a repeating unit, one of the polymerization groups represented by the following general formula (2);

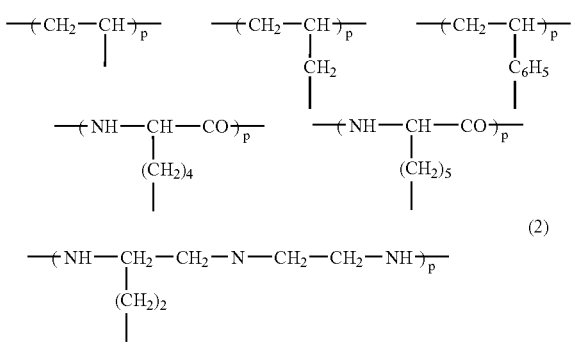

(2)

in the formula, p is an integer
and wherein the guanidine compound and/or salt thereof has a biguanide structure represented by the following general formula (3) in a molecule thereof;

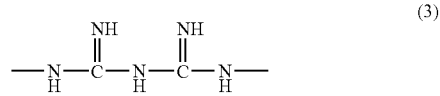

(3)

2. The rust prevention coating agent according to claim 1, wherein the guanidine compound is at least one compound selected from the group consisting of 1-o-tolyl biguanide, polyhexamethylene biguanidine, polyhexaethylenebiguanidine, polypentamethylenebiguanidine, polypentaethylenebiguanidine, polyvinylbiguanidine, and polyallylbiguanidine.

3. The rust prevention coating agent according to claim 1, which comprises the fluorine and zirconium-containing compound in a concentration of 10 to 10000 ppm and the guanidine compound and/or salt thereof of in a concentration of 1 to 10000 ppm and an effective fluorine ion concentration of 0.1 to 1000 ppm and has a pH of 1 to 5.

4. A method of rust-proofing aluminum and/or aluminum alloy comprising a step of treating a metal surface with a rust prevention coating agent, wherein said rust prevention coating agent is the rust prevention coating agent according to claim 1.

5. The rust prevention coating agent according to claim 2, which comprises the fluorine and zirconium-containing compound in a concentration of 10 to 10000 ppm and the guanidine compound and/or salt thereof of in a concentration of 1 to 10000 ppm and an effective fluorine ion concentration of 0.1 to 1000 ppm and has a pH of 1 to 5.

6. A method of rust-proofing aluminum and/or aluminum alloy comprising a step of treating a metal surface with a rust prevention coating agent, wherein said rust prevention coating agent is the rust prevention coating agent according to claim 2.

7. A method of rust-proofing aluminum and/or aluminum alloy comprising a step of treating a metal surface with a rust prevention coating agent, wherein said rust prevention coating agent is the rust prevention coating agent according to claim 3.

8. A method of rust-proofing aluminum and/or aluminum alloy comprising a step of treating a metal surface with a rust prevention coating agent, wherein said rest prevention coating agent is the rust prevention coating agent according to claim 5.

* * * * *

UNITED STATES PATENT AND TRADEMARK OFFICE
CERTIFICATE OF CORRECTION

| | |
|---|---|
| PATENT NO. | : 7,029,522 B2 |
| APPLICATION NO. | : 10/778236 |
| DATED | : April 18, 2006 |
| INVENTOR(S) | : Norizumi Matsui et al. |

It is certified that error appears in the above-identified patent and that said Letters Patent is hereby corrected as shown below:

IN THE CLAIMS:

Please amend claim 3 - column 11, line 1 as follows: "the guanidine compound and/or salt thereof in a"

Please amend claim 5 – column 11, line 13 as follows: "the guanidine compound and/or salt thereof in a"

Please amend claim 8 – column 12, line 16 as follows: "wherein said rust prevention coating agent is the rust"

Signed and Sealed this

Third Day of April, 2007

JON W. DUDAS
*Director of the United States Patent and Trademark Office*